United States Patent [19]

Fantacci

[11] Patent Number: 4,881,488
[45] Date of Patent: Nov. 21, 1989

[54] EQUIPMENT FOR AUTOMATING THE DISTRIBUTION OF PREPARATORY SOLUTION USED IN THE RECAPPING OF TIRE TREADS

[75] Inventor: Tosco Fantacci, Pistoia, Italy
[73] Assignee: CISAP S.p.A., Pistoia, Italy
[21] Appl. No.: 199,325
[22] Filed: May 26, 1988
[30] Foreign Application Priority Data
  May 27, 1987 [IT] Italy .................................. 9397 A/87
[51] Int. Cl.⁴ .......................... B05B 13/04; B05C 5/00
[52] U.S. Cl. ..................................... 118/320; 118/322; 118/324; 425/17; 198/411; 198/680
[58] Field of Search ............... 118/320, 322, 318, 324; 425/17; 198/680, 345, 344, 411

[56] References Cited
U.S. PATENT DOCUMENTS

| | | | |
|---|---|---|---|
| 2,309,590 | 1/1943 | Honderich | 198/680 |
| 2,799,243 | 7/1957 | Harb | 118/320 |
| 3,467,063 | 9/1969 | Brinkley | 118/324 |
| 3,472,716 | 10/1969 | Sutherland | 118/324 |
| 3,962,987 | 6/1976 | Brandl | 118/322 |
| 4,289,089 | 9/1981 | Tacke | 118/318 |
| 4,430,958 | 2/1984 | Boggs | 118/318 |
| 4,724,170 | 2/1988 | Boone | 118/210 |

FOREIGN PATENT DOCUMENTS

WO86/06008 10/1986 PCT Int'l Appl. ................. 118/320

Primary Examiner—Shrive Beck
Assistant Examiner—Vi D. Dang
Attorney, Agent, or Firm—McGlew and Tuttle

[57] ABSTRACT

A conveyor on which tires are suspended, with sufficient travel to ensure that they dry out following treatment, for conveying them through a distribution chamber for the solution, equipped with devices for discharging jets of the solution; a movable arm is inserted in between two adjacent tires and temporarily lifts off at least one of them in order to rotate it in front of the discharge devices.

9 Claims, 3 Drawing Sheets

4,881,488

EQUIPMENT FOR AUTOMATING THE DISTRIBUTION OF PREPARATORY SOLUTION USED IN THE RECAPPING OF TIRE TREADS

FIELD OF THE INVENTION

The subject of the invention is equipment for automating at least one of the preparatory operations involved in the process of recapping tire treads.

More particularly, the invention concerns equipment for automating the distribution of a preparatory solution over the surfaces of tires that are prepared for the recapping of the treads and similar applications.

SUMMARY OF THE INVENTION

Essentially, the inventive equipment comprises: a conveyor on which tires are suspended, with sufficient travel to insure that they dry out following treatment; a distribution chamber for the solution, traversed by said conveyor; devices in said chamber for discharging jets of the solution; a movable arm for insertion in between two adjacent tires and for the temporary lifting off of at least one tire from the conveyor element on which it is suspended; and devices for causing said tire to rotate in front of the discharge devices.

Said movable arm exhibits to advantage a pair of rollers shaped in such a way that they engage the tire in order to lift it off, and devices to actuate rotation of at least one of said rollers in order to rotate the tire. The rollers are shaped so that they engage the inside rims, or the so-called beads, of the tire.

In practice said movable arm is articulated so that it can move angularly in an approximately vertical plane, and bears at the end a head that can pivot around the axis of the arm, and on which are mounted, projecting laterally, said two rollers, at least one of which is caused to rotate.

In the equipment in question, the discharge devices can comprise at least one nozzle, mounted on a movable element endowed with reciprocating motion around an essentially vertical axis or at least parallel with a tangent to the tire in a position almost opposite the side from which said movable arm extends; in this way the nozzle distributes the solution over the top of the tire where it is arched in transverse section.

BRIEF DESCRIPTION OF THE DRAWINGS

The drawings illustrate in diagrammatic form one embodiment of the invention, by way of a non-limitative example. Thus.

DESCRIPTION OF THE PREFERRED EMBODIMENT

Figure 1:
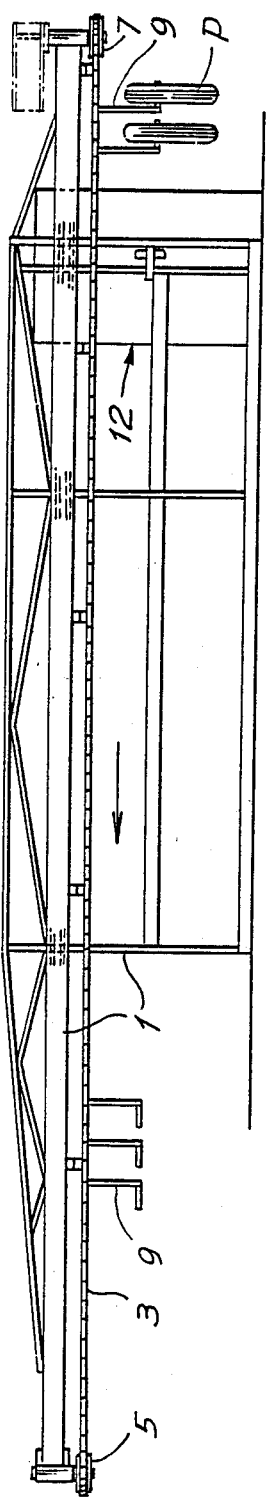
FIGS. 1 and 2 represent a lateral and plan view of the whole equipment arrangement.
Figure 2:
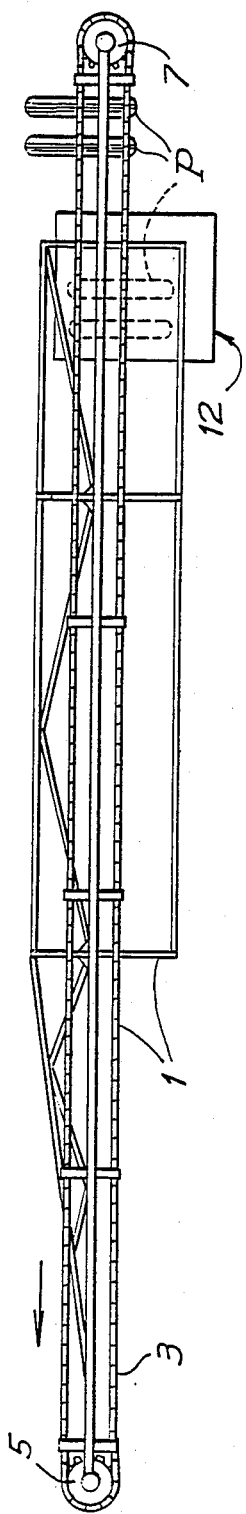

As illustrated in the attached drawings, a continuous conveyor 3, appropriately guided, is mounted on a frame 1, the conveyor being driven by wheels 5 and 7; the continuous conveyor 3, which can be of the chain type or similar, exhibits a number of attachments 9 spaced close together and designed to support individual suspended tires, like the ones indicated by P in the drawings; These attachments are designed in such a way that they support the tires parallel to one another and close to one another in a lying position at right angles to the forward movement of the tires. The tires are loaded on at the end where the chain-wheel 7 is affixed and unloaded approximately where the chain-wheel 5 is affixed. The tires have been prepared by a treatment that removes the worn tread and are waiting to receive the new tread-strip to be heat-molded; the equipment serves to distribute over the surface of the tire, to which the new tread needs to be firmly affixed a solution intended to facilitate the adhesive force and vulcanization of the new tread in relation to the carcase of the tire to be regenerated. The solution needs to be distributed more or less uniformly, and the treated surface must not be touched for a certain time after such distribution to allow a fixing process to take place through evaporation of solvents and the like. For this reason provision is made for the solution to be distributed automatically in a small chamber 12 next to the area where the tires to be treated are loaded so as to cause the tires that have been treated to travel a comparatively long distance until they reach the transmission wheel 5, whereupon the tire can be removed from its support 9 for further processing.

Figure 3:
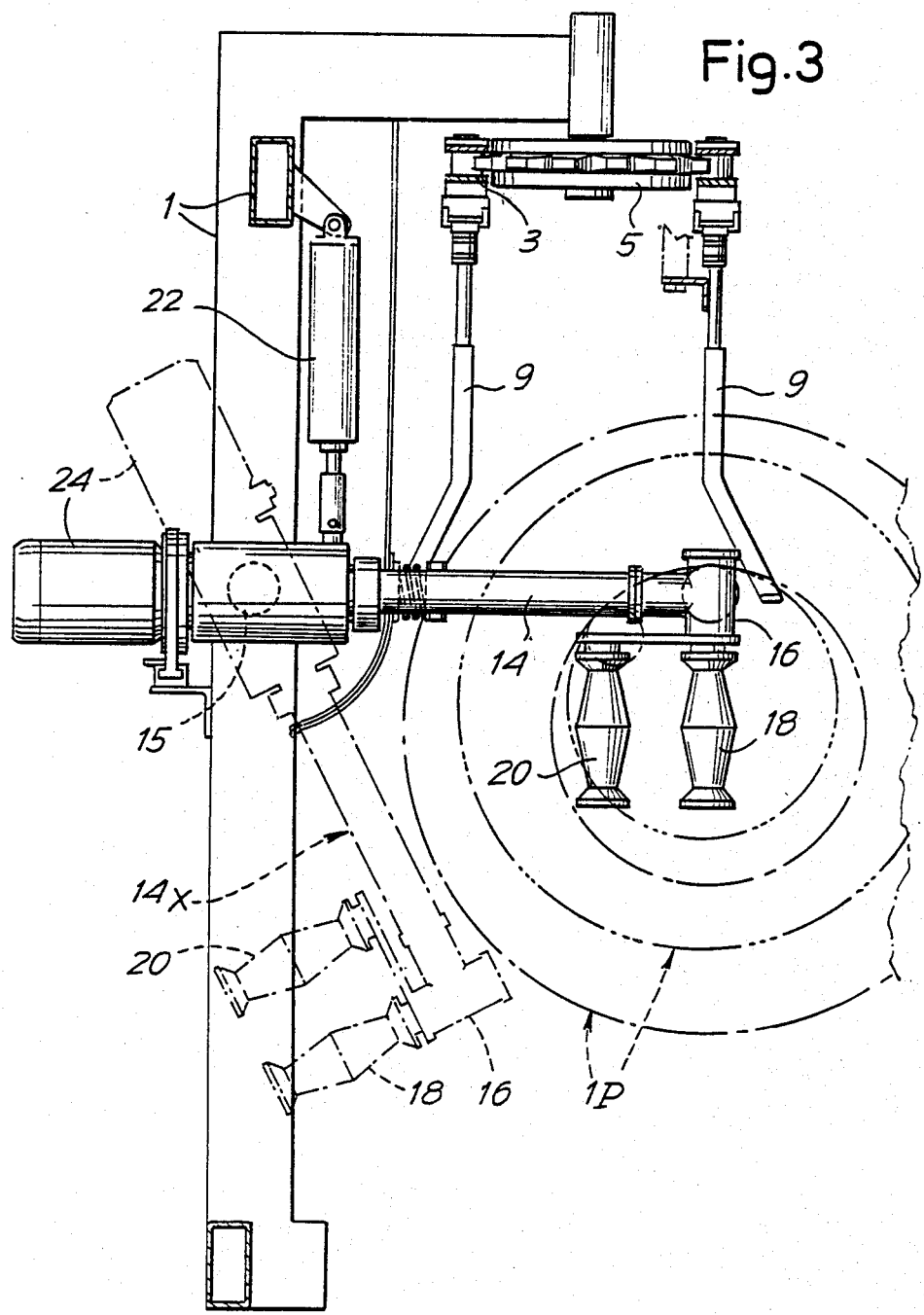
FIG. 3 is a in transverse sectional view illustrating the method whereby the tire is supported and rotated.
Figure 5:
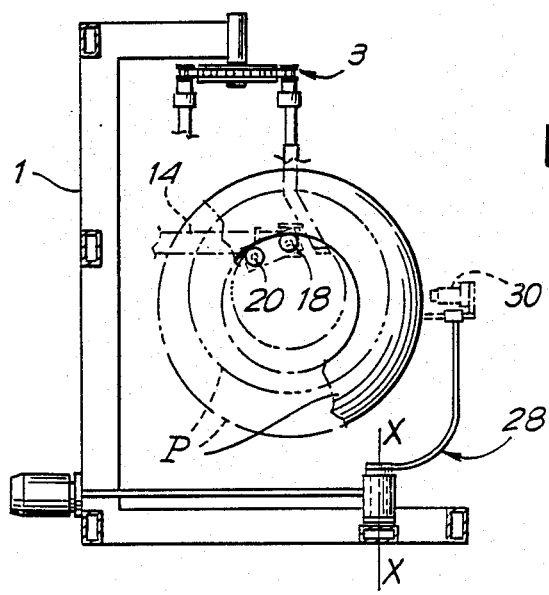
FIGS. 5 and 6 represent the mechanism for distributing the solution, in a side view analogous to that in FIG. 3 and a plan view.
Figure 6:
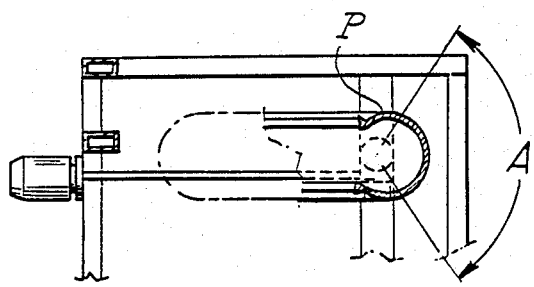

The smaller chamber 12 is in a position that corresponds with the sections in FIGS. 3, 5 and 6; the small chamber is not specially designed in that it can be of different shapes, including a completely bell-like shape, calculated in any case to eliminate noxious vapors and prevent dispersion. The small chamber is traversed by the conveyor 3 and hence by the hook-support attachments 9 and the tires P to be treated.

Figure 4:
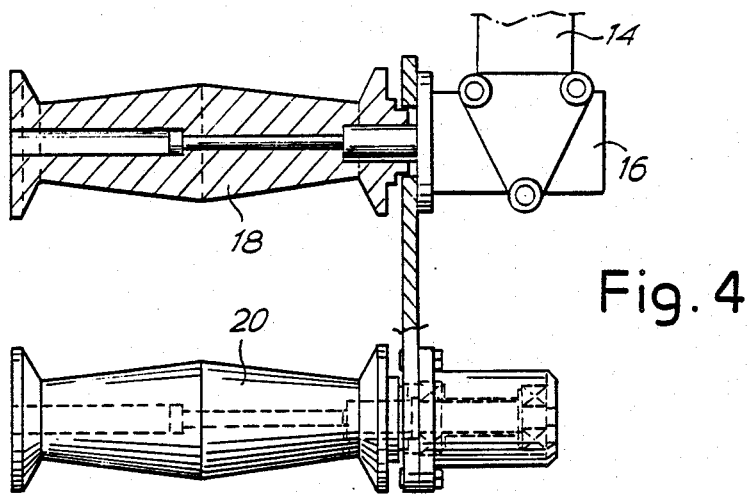
FIG. 4 is an enlarged detailed view of FIG. 3.

In correspondence with the area where the solution is distributed, an arm 14 is provided—in a version with a single distribution station facility—attached at 15 by an articulated joint to the fixed frame in order to move between the position indicated by an uninterrupted line and the position 14X indicated by a broken line, at a downwards angle and towards the inside, so as not to obstruct the tires of the largest diameter liable to be treated in the appliance. The arm 14 displays a head 16 capable of rotating around the axis of same arm 14 and on which are mounted, projecting laterally, a pair of rollers or roller means 18, 20, whose axes lie in a plane passing through the axis of the arm 14. In one positioning of the head 16, the axes of the two rollers 18 and 20 are in a vertical plane, that to say, in the plane of travel by the arm 14 between the two positions indicated in FIG. 3; in this position the arm can wedge itself between two adjacent tires when the conveyor 3 is in a pause phase, said conveyor being endowed with a stop-start forward motion; the pause phase serves to permit the solvent to be distributed over one of the tires that has come to be positioned next to where the arm 14 is positioned. After the conveyor 3 has stopped, the arm 14 is raised from the position 14X to a nearly horizontal position, a hydraulic control system 22 being used for the purpose; in the raised, near horizontal position of the arm 14, the head 16 is rotated round the axis of the same arm 14 in such a manner that the rollers 18 and 20 move from a position where the axes are in a vertical plane to a position in which their axes are horizontally placed; through the displacement of the arm 14 and the rotation of the head 16, the rollers 18, 20 make contact with the inside rims of the tire and lift it gently off the attachment 9 on which it is suspended. In these conditions the tire can rotate round its own axis by sliding over the rollers 18 and 20 that support it while rotating. To actuate rotation, one of the rollers, roller 18 for example, is caused to rotate by a motor 24, that can be mounted on the element of the same arm and has a co-axial transmission system on the arm extending to the roller 18. The rollers are shaped in the manner clearly indicated in FIG. 4, with a tapered profile at both ends and two annular edges, one at each end, so that they can center the tire by engaging its two beads (i.e. the inside rims) in correspondence with the reduced cross-sectional areas of the rollers 18 and 20. Under this arrangement the tire, in these conditions, makes several complete turns while receiving the solution being discharged from a station aligned with the position of the rotating tire.

FIGS. 5 and 6 represent in diagram form a discharge system wherein the solvent is distributed along an arc A that can be appropriately adjusted in accordance with the type of tire being treated. For this purpose, an element 28 is supplied that is capable of movement along the fixed vertical axis X—X, and is driven by a suitable motor-propulsion system for displacing said element 28 angularly according to the arc A that has been programmed. The element 28 comprises at least one distributor nozzle 30 in the upper part, corresponding roughly with the horizontal diameter of the tire P suspended on the rollers 18 and 20. The spray nozzle 30 is fed the solution or the treatment liquid by a pump. During the rotation of the tire the nozzle 30 together with the element 28 moves according to the arc A in order to distribute the solvent. To ensure that this is evenly distributed, it can be arranged for the element 28, 30 to travel at least once through the angle described by the arc A while the rotating tire completes several turns.

This results in automatic, uniform distribution of the treatment solution over the outer surface of the tire, without any need for manual intervention.

Any of the solution that has been spattered around, or any vapors that it gives off, can be collected up by suitable suction systems.

On completion of the solvent distribution cycle, the arm 14 starts to lower itself and the tire is replaced on its attachment 9 on which it was suspended, the arm head is re-rotated in order to shift the rollers so that their axis rests in the vertical plane, and the arm reverts to the position 14X, passing between two adjacent tires; whereafter the conveyor 3 starts to move forward again for a further stage.

Moving forward in start-stop mode on the conveyor 3, the treated tires are kept suspended until they arrive at the transmission wheel 5, at which point the tires can be removed and dispatched for further processing.

The drawings represent by way of exemplification only one embodiment of the invention, which can take the form of a variety of embodiments and arrangements.

I claim

1. An arrangement for automatic distribution of a solution over surfaces of a tire, comprising:
    a conveyor including suspension means for suspending a plurality of tires, each tire of the plurality of tires being positioned at spaced-apart locations along said conveyor, said conveyor being movable to position tires along a tire path and successively position tires at a treatment location;
    a pivotal arm positioned adjacent said treatment location, said pivotal arm being movable between a first position outside of the tire path and a second position along the tire path;
    roller means for engaging beads of a tire, of the plurality of tires, positioned at said treatment location, and for rotating the tire positioned at the treatment location about an axis; and
    roller pivot means, connected to said pivotal arm and connected to said roller means, for moving said roller means into and out of engagement with beads of the tire positioned at the treatment location, when said pivotal arm is in said second position.

2. An arrangement according to claim 1, wherein said roller pivot means move said roller means such that the tire positioned at the treatment location is lifted from said suspension means, said roller means including a roller attached to said roller pivot means and a motor for driving said roller in rotation.

3. An arrangement according to claim 2, wherein said roller includes recessed portions extending around a circumferential surface of said roller, said recessed portions being adapted to engage the beads of a tire.

4. An arrangement according to claim 1, wherein said pivotal arm is attached to a fixed pivot and has an end carrying said roller pivot means, said pivotal arm lying adjacent the bead of the tire positioned at the treatment location in said second position, said pivotal arm moving in a substantially vertical plane, said roller means including rollers extending laterally of said pivotal arm.

5. An arrangement according to claim 1, further comprising:
    a spray nozzle adjacent said treatment location.

6. An arrangement according to claim 5, further comprising spray nozzle movement means, connected to said spray nozzle for moving said spray nozzle about a spray nozzle axis between a first and second position to spray a surface of the tire positioned at the treatment location, said spray nozzle axis being substantially perpendicular to the axis of rotation of the tire positioned at the treatment location.

7. An arrangement for automatic distribution of a solution over surfaces of a tire, comprising:
    a conveyor including suspension means for suspending a plurality of tires, each tire of the plurality of tires being positioned at spaced-apart locations along said conveyor, said conveyor being movable to position tires along a tire path and successively position tires adjacent a treatment location;
    tire bead engagement means movable between a position outside of the tire path and a position along the tire path, for engaging beads of a tire, of the plurality of tires, positioned at the treatment location and for rotating the tire positioned at the treatment location about a predetermined tire axis of rotation;
    a spray nozzle positioned adjacent said treatment location; and
    spray nozzle movement means, connected to said spray nozzle, for moving said spray nozzle about a spray nozzle axis between a first and second position, to spray the surface of the tire positioned at the treatment location upon rotation of the tire positioned at the treatment location, said spray nozzle axis being substantially perpendicular to the tire axis of rotation.

8. An arrangement according to claim 1, further comprising;
    a spray nozzle positioned at said treatment location;
    spray nozzle movement means, connected to said spray nozzle for moving said spray nozzle about a spray nozzle axis, perpendicular to the tire axis, between a first and second position, to spray the surface of the tire positioned at the treatment location during rotation of the tire positioned at the treatment location; and chamber means positioned at said treatment location, said chamber means surrounding spray nozzle.

9. An arrangement according to claim 8, wherein said conveyor passes through said chamber means.

* * * * *